United States Patent
Elgarat

(10) Patent No.: US 9,430,362 B1
(45) Date of Patent: Aug. 30, 2016

(54) SYSTEM, METHOD, AND COMPUTER PROGRAM FOR GENERATING A FULLY TRACEABLE TEST DESIGN

(71) Applicant: Amdocs Software Systems Limited, Dublin (IE)

(72) Inventor: Sharon Elgarat, Kibbutz Mefalsim (IL)

(73) Assignee: Amdocs Software Systems Limited, Dublin (IE)

(*) Notice: Subject to any disclaimer, the term of this patent is extended or adjusted under 35 U.S.C. 154(b) by 0 days.

(21) Appl. No.: 14/506,548

(22) Filed: Oct. 3, 2014

(51) Int. Cl.
 G06F 11/36 (2006.01)
(52) U.S. Cl.
 CPC ....... G06F 11/3684 (2013.01); G06F 11/3676 (2013.01)
(58) Field of Classification Search
 None
 See application file for complete search history.

(56) References Cited

U.S. PATENT DOCUMENTS

| | | | | |
|---|---|---|---|---|
| 5,418,792 A * | 5/1995 | Maamari | ........ | G01R 31/318392 714/724 |
| 7,506,312 B1 * | 3/2009 | Girolami-Rose | ......... | G06F 8/71 717/101 |
| 7,694,272 B2 * | 4/2010 | Bronicki | .................... | G06F 8/34 717/104 |
| 7,958,407 B2 * | 6/2011 | Underdal | ................ | G06N 5/003 714/26 |
| 8,352,237 B2 * | 1/2013 | Bassin | ................. | G06F 11/3676 703/22 |
| 8,539,438 B2 * | 9/2013 | Bassin | .................... | G06Q 10/00 717/101 |
| 8,869,111 B2 * | 10/2014 | Gorthi | ................. | G06F 11/3684 717/124 |
| 9,122,799 B1 * | 9/2015 | Elgarat | ............... | G06F 11/3664 |
| 2004/0107414 A1 * | 6/2004 | Bronicki | ................... | G06F 8/34 717/105 |
| 2008/0005628 A1 * | 1/2008 | Underdal | ............... | G06N 5/003 714/57 |
| 2011/0066486 A1 * | 3/2011 | Bassin | .................. | G06Q 10/00 705/14.43 |
| 2013/0219227 A1 | 8/2013 | Augustine et al. | | |

FOREIGN PATENT DOCUMENTS

EP 0869433 A2 10/1998

OTHER PUBLICATIONS

Ostrand, T., et al., "A Visual Test Development Environment for GUI Systems", Proceedings of the 1998 ACM SIGSOFT International Symposium on Software Testing and Anaylsis [online], 1998 [retrieved Nov. 16, 2015], Retrieved from Internet: <URL: http://dl.acm.org/citation.cfm?id=271793>, pp. 82-92.*

* cited by examiner

Primary Examiner — Todd Aguilera
(74) Attorney, Agent, or Firm — Zilka-Kotab, PC

(57) ABSTRACT

A system, method, and computer program product are provided for generating a fully traceable test design. In use, a repository of parameters and associated values that are predefined as valid for the parameters is defined. Activity flows including one or more activities are further graphically defined, and the parameters are mapped to the one or more activities, the mapping functioning to connect the one or more activities to the values that are predefined as valid for the parameters. Further, business rules define incompatible pairings of the values across two or more of the parameters mapped to one or more of the activities. A plurality of test scenarios associated with the activity flows are then determined, and a subset of the plurality of test scenarios are automatically selected based on various predefined criteria. Moreover, test design materials associated with the test design are output.

9 Claims, 4 Drawing Sheets

SYSTEM, METHOD, AND COMPUTER PROGRAM FOR GENERATING A FULLY TRACEABLE TEST DESIGN

FIELD OF THE INVENTION

The present invention relates to test design, and more particularly to generating fully traceable test designs.

BACKGROUND

Testing of software is a critical step in the software development lifecycle. The objective of the testing is to verify and validate the integration of the software, the hardware and the configuration thereof, and to prevent malfunction of the software when in use.

Software acceptance testing is typically performed after the development of the software is completed. Therefore, the software testing period is on the critical path of the software development project. Efficient test design is an important step in the testing process. Existing test design processes and tools are capable of test design generation but lack high level design efficient capabilities.

There is thus a need for addressing these and/or other issues associated with the prior art.

SUMMARY

A system, method, and computer program product are provided for generating a fully traceable test design. In use, a repository of parameters and associated values is defined such that the parameters may be mapped to one or more activities during test design. Additionally, activity flows including the one or more activities are graphically defined, each of the activity flows including a directed acyclic graph (DAG) including the one or more activities as nodes. Further, the parameters are mapped to the one or more activities used in the graphically defined activity flows, the mapping functioning to connect the one or more activities to valid values, thereby defining all permutations of each of the one or more activities and each of the activity flows in the test design. In addition, business rules that define one or more relationships between at least some of the valid values associated with the one or more activities are defined, the business rules being operable to prevent creation of invalid test scenarios. Furthermore, test scenarios associated with the activity flows are selected as a set of test items to be translated to final tests for the test design, each of the test scenarios being a path where the valid values were selected for every parameter from every activity in a corresponding activity flow. Additionally, a coverage check of the selected test scenarios is performed, the coverage check being operable to identify a test coverage of the selected test scenarios associated with the test design. Moreover, test design materials associated with the test design are output, the test design materials including one or more of a diagram graph, one or more high level use case descriptions of each of the scenarios, and detailed tests associated with the test design.

DETAILED DESCRIPTION

Figure 1:
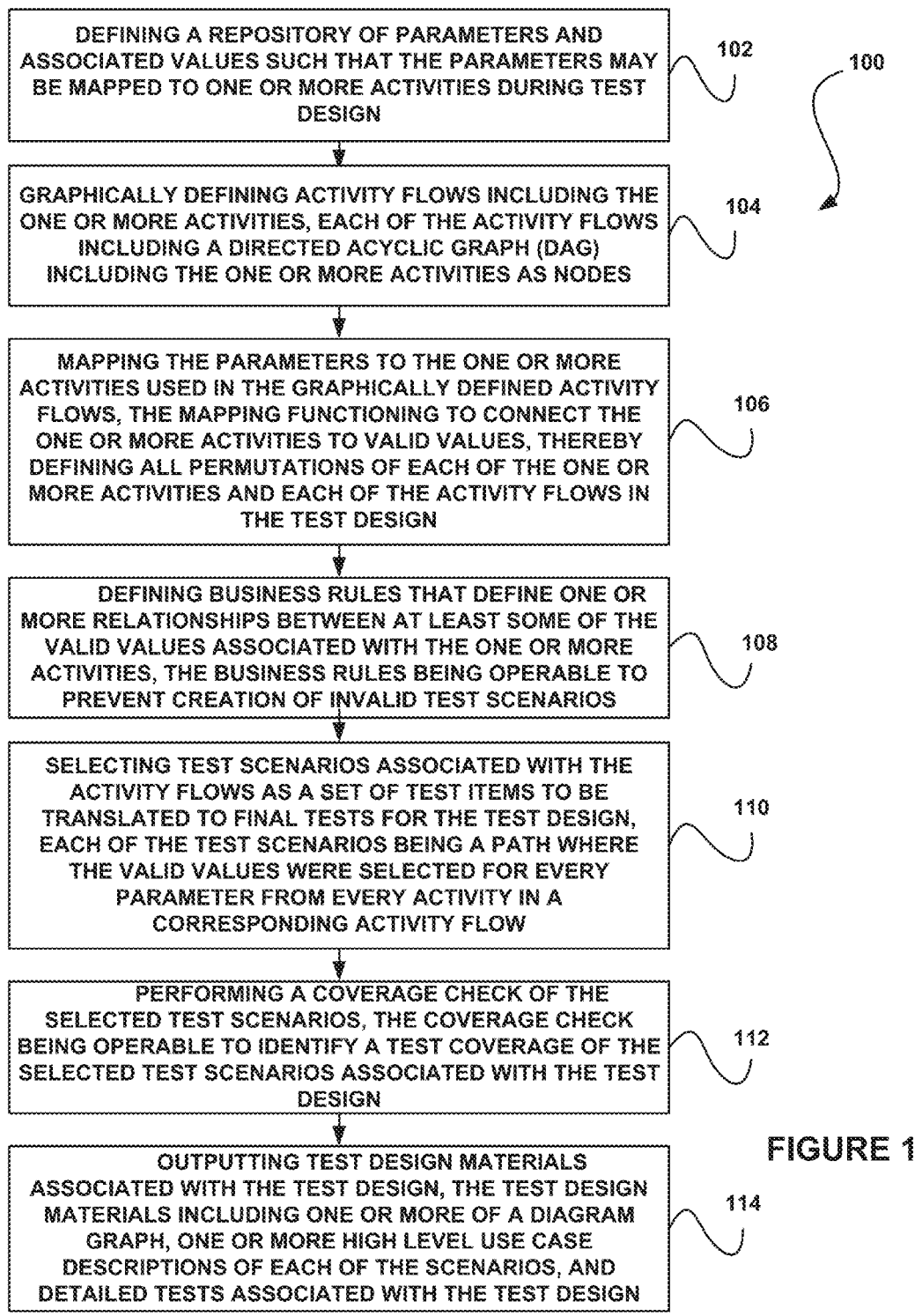
FIG. 1 illustrates a method for generating a fully traceable test design, in accordance with one embodiment.

FIG. 1 illustrates a method 100 for generating a fully traceable test design, in accordance with one embodiment.

As shown, a repository of parameters and associated values is defined such that the parameters may be mapped to one or more activities during test design. See operation 102. The repository may include any pool of parameters and values stored in any form of memory.

Additionally, the parameters and values may include any information associated with testing and test design. In one embodiment, the parameters and values may be defined by test designer.

Furthermore, the parameters may be associated with any number of values. For example, each of the parameters may be capable of being associated with two or more valid values.

As shown further in FIG. 1, activity flows including the one or more activities are graphically defined. See operation 104. In this case, each of the activity flows include a directed acyclic graph (DAG) including the one or more activities as nodes.

The directed acyclic graph may include any directed graph with no directed cycles. For example, the directed acyclic graph may be formed utilizing a collection of vertices and directed edges, each edge connecting one vertex to another, and the vertexes representing the nodes (i.e. activities).

The activity flows may be graphically defined in a variety of ways. For example, graphically defining the activity flows including the activities may include constructing a flow by dragging activities from an activity library and connecting the activities. In this case, a graphical user interface may be provided to graphically define the activity flows.

In addition, in one embodiment, graphically defining the activity flows may include generating a nested diagram representing a complex diagram that shows all detailed activities. As an option, each of the activity flows may be stored in a library repository for reuse. In this case, all repeating activity flows or sub-flows may be accessible for quick construction of common activity flows.

Further, the parameters are mapped to the one or more activities used in the graphically defined activity flows. See operation 106. In this case, the mapping functions to connect the activities to valid values, thereby defining all flow permutations of each of the activities and each of the activity flows in the scope of the test design.

In addition, business rules that define one or more relationships between at least some of the valid values associated with the one or more activities are defined. See operation 108. In one embodiment, business rules that define one or more relationships between at least some of the valid values associated with at least two or more parameters from at least one or more activities may be defined. The business rules are operable to prevent creation of invalid test scenarios due to business wise incompatible pairing of values.

In one embodiment, defining the business rules may include defining multiple relations between values in a graphical manner. Additionally, in one embodiment, each of the business rules may represent two groups of values such that no value from a first group is allowed to meet values from a second group. In this case, the first group and the second group may be capable of including values from two or more parameters which were mapped to one or more activity within a flow.

Furthermore, test scenarios associated with the activity flows are selected as a set of test items to be translated to final tests for the test design. See operation 110. Each of the test scenarios are a path where the valid values were selected for every parameter from every activity in a corresponding activity flow.

In various embodiments, selection of test scenarios associated with the activity flows may include an automatic selection of the test scenarios and/or a manual selection of the test scenarios. Additionally, in one embodiment, recommended test scenarios may be automatically provided for selection (e.g. provided to a designer).

Furthermore, selection of the test scenarios may be based on various criteria. For example, the selection of the test scenarios associated with the activity flows may be based on existing valid values, where the existing valid values are defined in each parameter as boundaries of a testing scope. As another example, the selection of the test scenarios associated with the activity flows may be based on the business rules, such that incompatibility rules are utilized to ensure only valid business scenarios are selected as scenarios.

As another example, the selection of the test scenarios associated with the activity flows may be based on a business priority. In another embodiment, the selection of the test scenarios associated with the activity flows may be based on a risk probability. In this case, the risk probability may be based on values and combinations that historically produced defects.

As another example, the selection of the test scenarios associated with the activity flows may be based on a customization level that includes an amount of effort invested in changing a value functionality associated with the test design. As yet another example, the selection of the test scenarios associated with the activity flows may be based on values that belong to activities that are central to a testing scope associated with the test design.

As another example, the selection of the test scenarios associated with the activity flows may be based on customer feedback (e.g. historical, etc.). As another example, the selection of the test scenarios associated with the activity flows may be based on a best combination of test scenarios to achieve complete coverage.

As shown further in FIG. 1, a coverage check of the selected test scenarios is performed. See operation 112. The coverage check is operable to identify a test coverage of the selected test scenarios associated with the test design.

Moreover, test design materials associated with the test design are output. See operation 114. The test design materials may include one or more of a diagram graph (e.g. including the activity flows, etc.), one or more high level use case descriptions of each of the scenarios, and detailed tests associated with the test design.

In one embodiment, the method 100 may be utilized to produce an agile test design with fully traceable steps allowing designers to continuously respond to changes and adopt the design at any given stage. Thus, new tests may be created at minimal effort and time with any and all changes in scope during the agile development of a tested system.

Employing the method 100 may help test designers by incorporating all design stages in to one tool (i.e. computer program(s), etc.), so the entire thinking process may be performed within the tool and may be represented by entities, which later, once change happens, the test designer has one consolidated system to update, linked to the final test ware. Thus, changes the designer makes at high level design may impact the detailed test cases directly.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
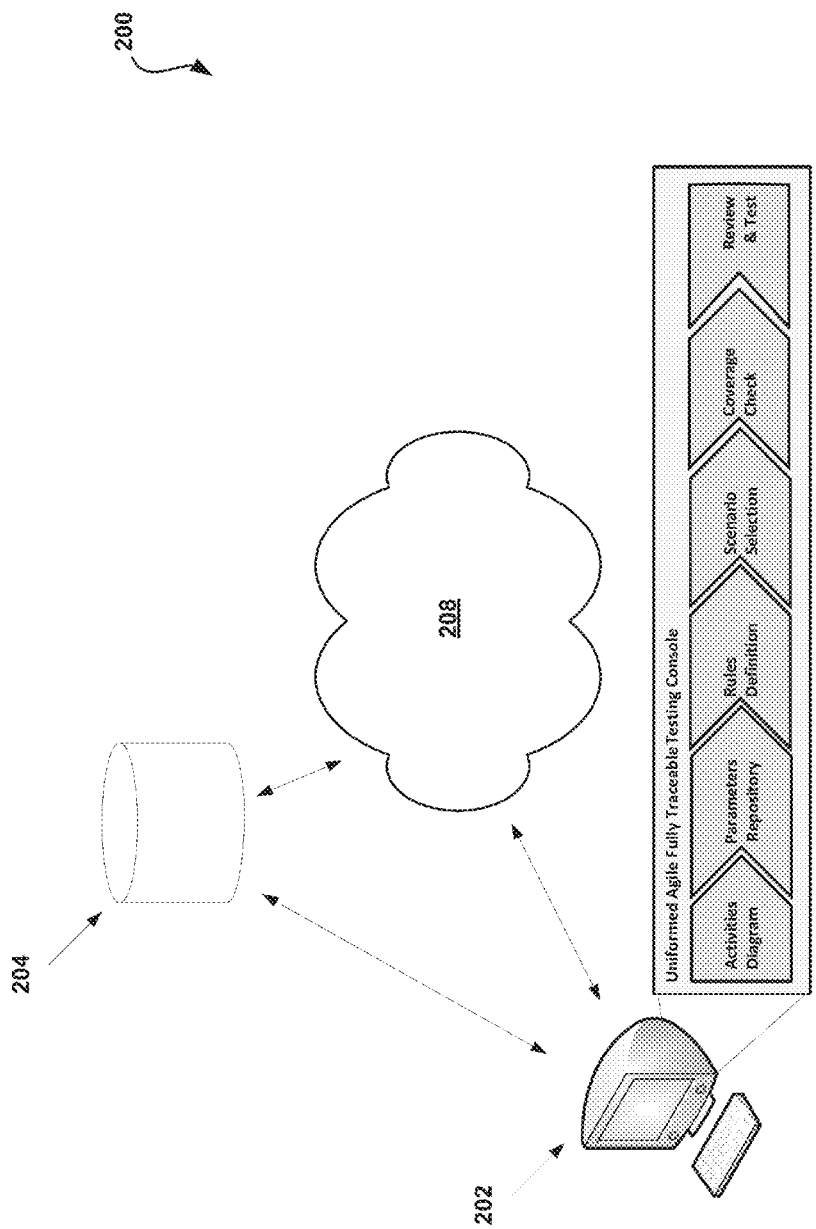
FIG. 2 illustrates a system for generating a fully traceable test design, in accordance with one embodiment.

FIG. 2 illustrates a system 200 for generating a fully traceable test design, in accordance with one embodiment. As an option, the system 200 may be implemented in the context of the details of FIG. 1. Of course, however, the system 200 may be implemented in the context of any desired environment. Further, the aforementioned definitions may equally apply to the description below.

The system 200 may include a test designer system 202, which may access one or more databases 204 over one or more networks 208. The test designer system 202 may have access to a testing design console. In operation, the testing design console may be utilized to generate an activities diagram, a parameters repository, define rules, select scenarios, perform coverage checks, and perform review and testing associated with designed tests.

Test design includes a high level design stage in which the designer analyzes the scope of designed tests and defines the scenarios that will be included within the designed test ware. The test design also includes a detailed design stage in which the scenarios selected during the high level design are translated to test cases. The testing design console (e.g. employed by the system 202) may combine all stages of the high level design with the stages of the detailed design to allow the user a single system (e.g. computer program(s)) for all of the design process.

Within the system 202, utilizing a tool including the testing design console, the designers may define parameters and valid values for those parameters. Each parameter may hold two or more valid values that will be available for all future actions that uses the parameter to define additional permutations of the same activity. The parameters may later be mapped to the different activities, so no matter how well or detailed the activity was written, the values that influence the selected permutation may always come from the standard set in the repository.

The tool may be used to define a flow of activities. A flow may be a directed acyclic graph with activities as nodes. The test design activities may start with the definition of flows made of activities that contain parameters. The tool may enable a designer to visually construct a flow by dragging activities from the library and connecting them.

The tool may also allow the flow to be represented using a nested (multi-leveled) diagram, to simplify a reader's experience of a highly complex diagram, while still showing all detailed activities. The tool may also allow a designer to reuse diagrams from a library repository that may store all repeating flows or sub flows to help quick construction of common flows.

Once graphically defining the flow from activities, the user may be asked to map the system's standardized parameters to the activities used in the flow. This mapping connects the activities to the different valid values, thus defining all permutations each activity and each flow in the graph can support.

A flow in the diagram with parameters and valid values may include multiple invalid combinations. Those combinations may be blocked in the system by business considerations that must be reflected in the tool to avoid creating invalid test scenarios. This may include employing a mechanism in the system to define highly aggregated business rules.

The rules created in the system may define multiple relations between values in a graphical simple manner. Each rule may represent two groups of values so no value from one group may be allowed to meet values from the other group. In a group, however, there may be values from two or more parameters from one or more activities within a flow.

In addition, the user may be able to characterize specific values or entire parameters in multiple types of characteristics, such as negative value, multi selection value, optional parameter, etc., which helps construct limitations for those values and parameters.

Scenarios are selected as the set of items to be translated to final tests. Each scenario is a path where valid values were selected for every parameter from every activity in a flow from within the overall graph.

In one embodiment, each selection (automatic or manual) must consider existing valid values, business rules, business priority, risk probability, customization level, centricity to the scope, past customer feedback, and selection of best combinations.

Existing valid values include values defined in each parameter as the boundaries of the testing scope. Business rules represent the incompatibility rules and characteristics made to make sure only valid business scenarios are considered. Business priority refers to the importance of the values selected to the customer.

Risk probability includes values and combinations that historically produced defects. The customization level is the amount of effort invested in changing the value functionality in the current project. The centricity to the scope includes values that belong to activities that are central to the tested scope. Past customer feedback includes combinations the customer preferred to include or selected to exclude from similar tests in the past. In one embodiment, selection of best combinations may include utilizing a pairwise algorithm.

The tool may function to open the graph in to its flows and then allow selection of scenarios for each of the flows. In one embodiment, the tool may support manual selection in which the user choses values one by one for each activity. Additionally, in one embodiment, the tool may represent graphically the most recommended values to obtain higher coverage and disable values that must not be selected due to business rules or characteristic. The tool may also support automatic selection, interfacing with a recommendations engine to request a recommendation, processing the response, and automatically generating the added scenarios.

In addition to the capability to present the most recommended values to increase coverage, the tool may allow the user ability to constantly check pairwise coverage for each parameter. The tool may also allow a designer to modify scenarios from the coverage check, to increase a coverage level without creating added scenarios.

Finally, the tool may allow a designer to produce a print out of all test design materials generated during the design process, such as the diagram graph, the high level use case descriptions of each scenario, and the detailed tests. This output may be used to review the design and, if needed, make quick changes by going back and changing directly in the tool before producing a new print out.

The generation of tests for the detailed design becomes a single push of a button. One which, if needed, can be done many times after any change is required at high level design, achieving the full traceability target, which cannot exist in any tools that does not contain all the elements of the flow inside one organized system.

Utilizing the tools described herein, scope boundaries may be fully defined within one clear data structure. Additionally, there is standardization through an internal repository of parameters and values. In addition, there are reusable flows through a library repository of diagrams. Further, excluded values from the tested scope may be kept in a repository for traceability. Also, the tool uses a graphic flow description for quick maintenance due to scope changes.

The tool also allows for verification of coverage using pairwise concepts while building the flows. Also, the tool offers a designer the continued ability at each stage to go back, perform updates or check the logic for the previous stage actions. The tool also may present a full link from high level scope definitions onto the detailed selected tests. The tool may also support both Waterfall and Agile Methodologies.

Thus, the techniques describe herein offer a first time ever fully traceable system for test design to support Agile test design needs and a first time ever fully standardized system allowing clear control of the top priority values that comprise new permutations, while leaving all other minor details a level of freedom needed in test design.

Figure 3:
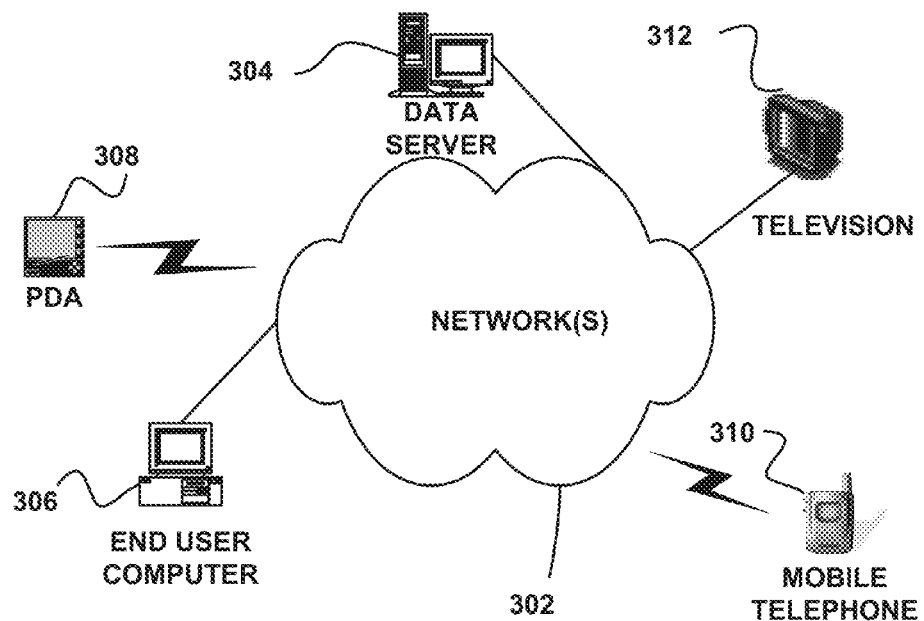
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
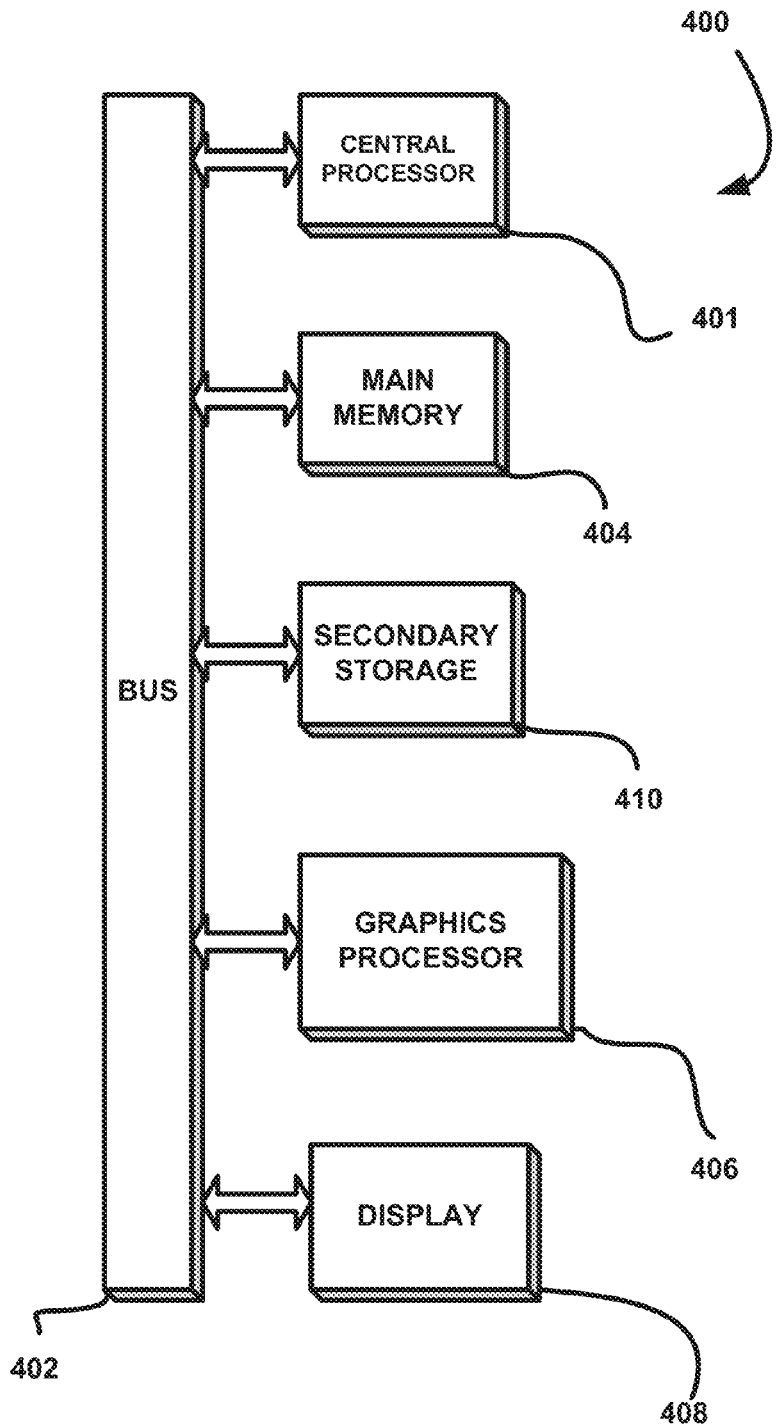
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    defining a repository of parameters and associated values that are predefined as valid for the parameters, where the parameters may be mapped to one or more activities during test design;
    graphically defining activity flows including the one or more activities, each of the activity flows including a directed acyclic graph (DAG) including the one or more activities as nodes;
    mapping the parameters to the one or more activities included in the graphically defined activity flows, the mapping functioning to connect the one or more activities to the values that are predefined as valid for the parameters, thereby defining all permutations of each of the one or more activities and each of the activity flows in the test design;
    defining business rules that define incompatible pairings of the values associated with two or more of the parameters mapped to one or more of the activities;
    determining a plurality of test scenarios associated with the activity flows;
    automatically selecting a subset of the plurality of test scenarios, each of the selected test scenarios being a path where valid values were selected, based on:
        the business rules,
        risk probability including values and combinations of values that historically produced defects,
        customization level including an amount of effort invested in changing value functionality in the test design,
        past customer feedback including combinations a customer preferred to include or selected to exclude from tests in the past, and
        best combinations determined utilizing a pairwise algorithm;
    performing a coverage check of the selected test scenarios, the coverage check being operable to identify a test coverage of the selected test scenarios associated with the test design; and
    outputting test design materials associated with the test design, the test design materials including one or more of a diagram graph, one or more high level use case descriptions of each of the scenarios, and tests associated with the test design.

2. A computer program product embodied on a non-transitory computer readable medium, comprising:
    computer code for defining a repository of parameters and associated values that are predefined as valid for the parameters, where the parameters may be mapped to one or more activities during test design;
    computer code for graphically defining activity flows including the one or more activities, each of the activity flows including a directed acyclic graph (DAG) including the one or more activities as nodes;
    computer code for mapping the parameters to the one or more activities included in the graphically defined activity flows, the mapping functioning to connect the one or more activities to the values that are predefined as valid for the parameters, thereby defining all permutations of each of the one or more activities and each of the activity flows in the test design;
    computer code for defining business rules that define incompatible pairings of the values associated with two or more of the parameters mapped to one or more of the activities;
    computer code for determining a plurality of test scenarios associated with the activity flows;
    computer code for automatically selecting a subset of the plurality of test scenarios, each of the selected test scenarios being a path where valid values were selected, based on:
        the business rules,
        risk probability including values and combinations of values that historically produced defects,
        customization level including an amount of effort invested in changing value functionality in the test design,
        past customer feedback including combinations a customer preferred to include or selected to exclude from tests in the past, and
        best combinations determined utilizing a pairwise algorithm;
    computer code for performing a coverage check of the selected test scenarios, the coverage check being operable to identify a test coverage of the selected test scenarios associated with the test design; and
    computer code for outputting test design materials associated with the test design, the test design materials including one or more of a diagram graph, one or more high level use case descriptions of each of the scenarios, and tests associated with the test design.

3. The computer program product of claim 1, wherein the computer program product is operable such that each of the parameters are associated with two or more values that are predefined as valid for the parameters.

4. The computer program product of claim 1, wherein the computer program product is operable such that graphically defining the activity flows including the one or more activities includes constructing a flow by dragging the one or more activities from an activity library and connecting the one or more activities.

5. The computer program product of claim 1, wherein the computer program product is operable such that graphically defining the activity flows includes generating a nested diagram representing a complex diagram that shows all activities.

6. The computer program product of claim 1, wherein the computer program product is operable such that each of the activity flows are stored in the repository for reuse, such that the activity flows or sub-flows thereof are accessible for use in constructing additional activity flows.

7. The computer program product of claim 1, wherein the computer program product is operable such that the incompatible pairings of the values associated with two or more of the parameters are defined in a graphical manner.

8. The computer program product of claim 1, wherein the computer program product is operable such that the selection of the subset of the plurality of test scenarios is further based on a business priority.

9. A system comprising:
    a memory of a computer system; and
    a processor of the computer system coupled to the memory configured to:

define a repository of parameters and associated values that are predefined as valid for the parameters, where the parameters may be mapped to one or more activities during test design;

graphically define activity flows including the one or more activities, each of the activity flows including a directed acyclic graph (DAG) including the one or more activities as nodes;

map the parameters to the one or more activities included in the graphically defined activity flows, the mapping functioning to connect the one or more activities to the values that are predefined as valid for the parameters, thereby defining all permutations of each of the one or more activities and each of the activity flows in the test design;

define business rules that define incompatible pairings of the values associated with two or more of the parameters mapped to one or more of the activities;

determine a plurality of test scenarios associated with the activity flows;

automatically select a subset of the plurality of test scenarios, each of the selected test scenarios being a path where valid values were selected, based on:

the business rules, risk probability including values and combinations of values that historically produced defects, customization level including an amount of effort invested in changing value functionality in the test design, past customer feedback including combinations a customer preferred to include or selected to exclude from tests in the past, and best combinations determined utilizing a pairwise algorithm;

perform a coverage check of the selected test scenarios, the coverage check being operable to identify a test coverage of the selected test scenarios associated with the test design; and output test design materials associated with the test design, the test design materials including one or more of a diagram graph, one or more high level use case descriptions of each of the scenarios, and tests associated with the test design.

* * * * *